Figure 1:
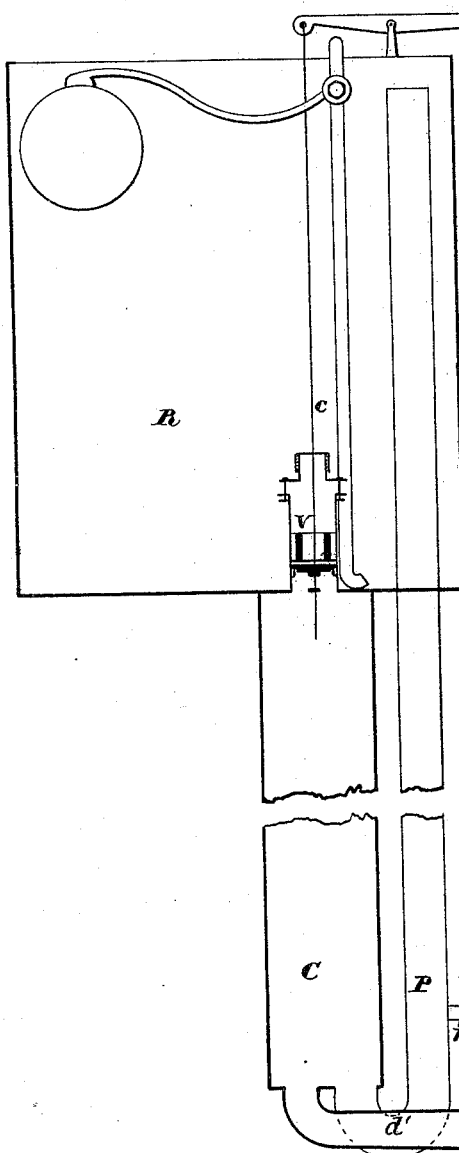

(No Model.)

J. P. PUTNAM.
WATER CLOSET.

No. 285,927. Patented Oct. 2, 1883.

Witnesses:
N. W. Swan
Will S. Rogers

Inventor:

United States Patent Office.

JOHN PICKERING PUTNAM, OF BOSTON, MASSACHUSETTS.

WATER-CLOSET.

SPECIFICATION forming part of Letters Patent No. 285,927, dated October 2, 1883.

Application filed June 2, 1882. (No model.)

*To all whom it may concern:*

Be it known that I, JOHN PICKERING PUTNAM, of Boston, in the State of Massachusetts, have invented certain new and useful Improvements in Water-Closets and Similar Waste-Receptacles, of which the following is a specification.

The present invention is an improvement upon the invention described and claimed in my pending application, No. 63,041.

In the apparatus described and claimed in that application the main water-supply is introduced to the trap of a water-closet or similar waste-receptacle from a chamber in which a column of water is normally supported by the pressure of the atmosphere upon the water standing in the trap, the passage-way from the said chamber entering the basin or trap above the level of the dip of the trap and below the level of the outlet of the trap. When, by evaporation or siphonage, the water in the trap falls below this passage-way, air entering the passage-way and rising to the top of the chamber balances the pressure of the atmosphere upon the water in the trap until sufficient water descends from the chamber to restore the required level in the trap and again close the passage-way. In a modification of the apparatus described and shown in my said application No. 63,041, for which I have applied for a separate patent, I have shown a similar-trapped basin and supply-chamber with a double mouth or passage-way between them, the upper of which enters the trap between the level of the dip of the trap and the level of its outlet, and maintains the level of the seal, so that the lower mouth or main entrance may be at any distance below the level of the seal of the trap and in any required direction.

In the present apparatus I make use of a trapped basin and water supply-chamber, substantially as in my said other applications, and preserve the important feature of the above-mentioned modification by which the main passage-way (and it might be the only passage-way) from the supply-chamber enters the trap at any distance below the normal water-level therein and in any required direction; but instead of maintaining the normal water-level of the basin or trap by means of a second passage-way entering at about the level of the dip of the trap, I make use of a bent stand-pipe which has a dip of its own substantially at the required level of the water in the trap, while one arm thereof opens to the air and the other communicates with the interior of the water-supply chamber, so that water will stand in the open arm at the same level at which it stands in the trap of the basin.

Accordingly the present invention consists, chiefly, in the combination of a trapped basin, an air-tight water-supply chamber provided with a mouth or passage-way entering the trap of the basin below its seal, and a bent stand-pipe which has a dip of its own substantially at the level of the said seal, and whose arms communicate one with said supply-chamber and the other with the open air.

The invention consists, further, in certain details of construction whereby the said stand-pipe is adapted to perform additional offices to that mentioned above. For instance, while, in the apparatus shown in the said other applications, the upper-flushing water enters the basin through a separate pipe from an additional reservoir, in the present apparatus it enters from the lower or air-tight chamber through the stand-pipe or a branch thereof.

As in the apparatus described in my said application No. 63,041, however, the water-supply chamber has a main reservoir, which is open to the air that acts upon the water in the supply-chamber through a valve, the port of which is smaller in area than the combined area of the outlets of the chamber, so that the chamber is always full.

Figure 2:
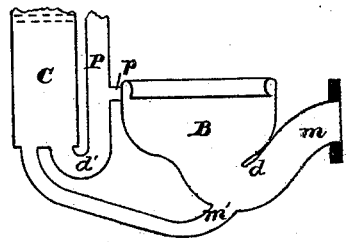
Figure 3:
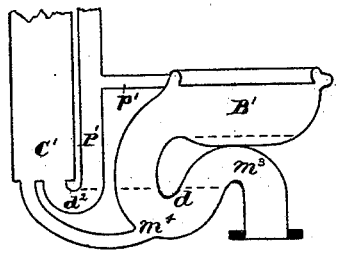

In the drawings, Figure 1 is a vertical section of apparatus embracing my present invention. Figs. 2 and 3 are partial vertical sections of modifications of the apparatus shown at Fig. 1. The following description, however, relates to Fig. 1, except as hereinafter especially set forth.

B is the trapped basin, having its dip at $d$ and its discharge-passage or mouth at $m$.

C is the air-tight water-chamber, communicating with the trap of the basin B by a passage-way, which opens into the bottom of the trap at $m'$ in a direction to drive the contents of the trap toward the mouth or outlet $m$.

R is the upper reservoir, communicating with the chamber C by means of a valve, $V_{,,}$ operated by a cord, $c$, lever $l$, and cord $c'$.

P is the bent stand-pipe, having a dip, $d'$, substantially at the level of the outlet $m$ and above the level of the dip $d$. One arm of the stand-pipe P enters the chamber C at or near the bottom thereof, while the other extends upward through suitable packing in the bottom of the reservoir R to above the normal level of the water therein. A branch, $p$, from the stand-pipe P enters the basin B near the top, as shown. F is a fan therein.

The chamber C being air-tight and full of water, it is evident that the said water will be held therein by the pressure of the atmosphere upon the water in the trap of the basin B and pipe P until the water in the said basin and pipe, by siphonage or otherwise, falls below the dip $d'$. When this happens, air, passing under the said dip, rises in bubbles to the top of the chamber C until the level in the pipe P and traps is restored, as described in my said other applications. When the valve V is lifted from its seat, water will flow from the chamber C through the mouth $m'$ and act directly against the contents of the trap of the basin, and at the same time water will flow from the chamber C into the pipe P, a portion of which will pass directly through the branch pipe $p$ to flush the upper part of the basin, while a portion will rise in the pipe P above the basin. When the valve V is afterward closed, the water standing in the pipe P above the basin will descend and flow through the branch $p$ for an after flushing. In the apparatus shown the stand-pipe P serves, also, as an overflow-pipe for the reservoir R.

The apparatus shown at Fig. 2 differs from that shown at Fig. 1 only in having a deeper bowl or basin, and description, further than to suggest that similar letters indicate corresponding parts in the said two figures, is unnecessary.

At Fig. 3 a trapped wash-out basin, B', is substituted for the trapped basin B of the other figures; but it is only necessary, for a description of the modified apparatus, to point out that the dip $d^2$ of the stand-pipe P' is substantially at the level of the bottom of the outlet $m^3$ of the trap, and that the contents of the trap are acted upon by water entering from the air-tight chamber C' through a mouth, $m^4$, while the upper flushing is by water flowing from the said air-tight chamber C' through said stand-pipe P' and its branch $p'$.

It is obvious upon an inspection of Figs. 2 and 3, where deep bowls or basins are represented, that, without departing from the feature of my invention which relates to the maintaining of the seal of the basin, the arm of the pipe P, which is open to the air, instead of extending above the basin, might open directly into the basin, near the rim thereof, for an upper flushing.

It is also obvious that, without departing from my invention, the office of that arm of the pipe P which communicates with the chamber C might be performed by the chamber itself—that is, the pipe P might have but one bend and enter the chamber C substantially at the level of the seal of the basin.

I claim—

1. The combination, with a trapped basin suitable for a water-closet or similar waste-receptacle, and an air-tight water-supply chamber whose outlet communicates with the trap of said basin below its seal, of a bent pipe whose dip is substantially at the level of said seal, and whose arms communicate, respectively, with the said air-tight chamber and the open air, substantially as described, 2. The combination, with a trapped basin suitable for a water-closet or similar waste-receptacle, and an air-tight water-supply chamber whose outlet communicates with the trap of said basin below its seal, of a bent pipe which has a dip substantially at the level of said seal, and one of whose arms communicates with the said air-tight chamber, while the other communicates with the said basin for an upper flushing, substantially as described.

3. The combination, with the trapped basin B, reservoir R, air-tight chamber C, opening into the trap of said basin below the level of its seal, and valve V, of the bent pipe P, provided with the branch $p$, and adapted to serve as an overflow for the said reservoir, substantially as described.

JNO. PICKERING PUTNAM.

Witnesses:
ALEX. P. BROWNE,
JOHN J. BLIGH.